(No Model.)
W. SNELGROVE & R. F. GOYNE.
WATER SERVICE PIPE.
No. 593,338. Patented Nov. 9, 1897.
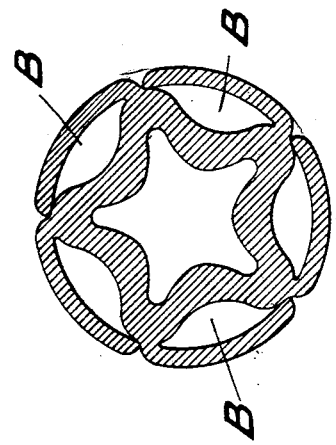
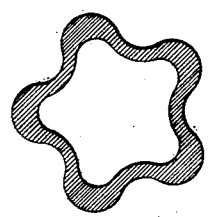
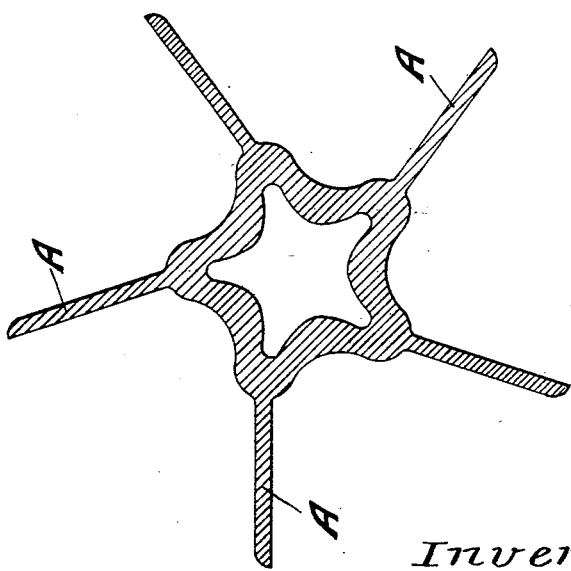
Witnesses
J. R. Bolton
A. N. Isaac
Inventors:
William Snelgrove
Richard Francis Goyne
By 
their Attorneys.

UNITED STATES PATENT OFFICE.

WILLIAM SNELGROVE AND RICHARD FRANCIS GOYNE, OF BIRMINGHAM, ENGLAND.

WATER SERVICE-PIPE.

SPECIFICATION forming part of Letters Patent No. 593,338, dated November 9, 1897.

Application filed April 28, 1897. Serial No. 634,278. (No model.)

*To all whom it may concern:*

Be it known that we, WILLIAM SNELGROVE, residing at Shirley, near Birmingham, and RICHARD FRANCIS GOYNE, residing at 16 Bromsgrove Street, in the city of Birmingham, England, subjects of the Queen of Great Britain, have invented certain new and useful Improvements in Water Service-Pipes, of which the following is a specification.

This invention consists of improvements relating to pipes of lead or other soft metal or alloy, our object being to so construct such pipes that the contained water shall be less liable to freeze, and in the event of freezing the pipes shall be less liable to split or burst than the pipes of ordinary construction.

In the accompanying sheet of explanatory drawings to be hereinafter referred to, Figures 1 and 2 are cross-sectional views representing the form of pipe we employ in situations exposed to low temperatures and for services where it is of great importance to prevent bursting. Fig. 3 is a cross-sectional view of a pipe suitable for services where the temperature falls but a little below the freezing-point or where a cheaper form of pipe is required than that illustrated at Figs. 1 and 2.

Each form of pipe illustrated can be readily produced by forcing or squirting the metal when in a plastic condition through a die of the required form having a mandrel at its center to give the required internal dimensions.

As illustrated at Figs. 1 and 2, we make the cross-section of the body of the pipe of a corrugated or convoluted configuration, and the corrugations are so arranged that the convex portion of one is diametrically opposite the concave portion of another. On the expansion of the water after its temperature falls below the point of maximum density the expansive action produces a slight yielding of the corrugations in an outward direction, thus automatically increasing the area or capacity of the pipe to suit the increased volume of water. On the exterior of the body of the pipe we form projecting strips, as A, Fig. 1, extending the whole length of the pipe, and such strips we subsequently bend or close onto the body to form the complete pipe, as illustrated at Fig. 2, with non-conducting air-spaces, as B, between the inner and outer portions.

In the form of pipe shown at Fig. 3, where the outer casing portion and the intervening air-spaces are dispensed with, we vary the thickness of the corrugations in order that the complete pipe shall offer a uniform resistance to the internal pressure. The internal pressure imposed upon the pipe when in service tends to laterally compress the metal along the crown of each of the internal corrugations, but to extend or stretch the metal along the crown of each of the external corrugations. The metal being weaker under a tensile than under a compressive stress we provide a greater thickness of metal in the external than in the internal corrugations, as illustrated at Fig. 3. The relative thickness of the inner and outer corrugations is made such that the force which will stretch the thick part a certain extent will be sufficient to compress the thin part to a like extent.

Having now described our invention, what we claim as new, and desire to secure by Letters Patent, is—

1. A water service-pipe with a corrugated inner portion in combination with an outer casing or cover and with air-spaces between such inner and outer portions, the said casing forming a series of compartments between itself and the corrugations, as set forth.

2. A water service-pipe with a corrugated body or inner portion in combination with externally-projecting strips as A bent or closed onto such body or inner portion, as set forth.

In witness whereof we have hereunto set our hands in presence of two witnesses.

WILLIAM SNELGROVE.
RICHARD FRANCIS GOYNE.

Witnesses:
EDWARD MARKS,
HERBERT BOWKETT.